March 30, 1965 A. S. FENSTER ETAL 3,175,867
PERIPHERAL FEED BLOWER
Filed May 31, 1962 4 Sheets-Sheet 2
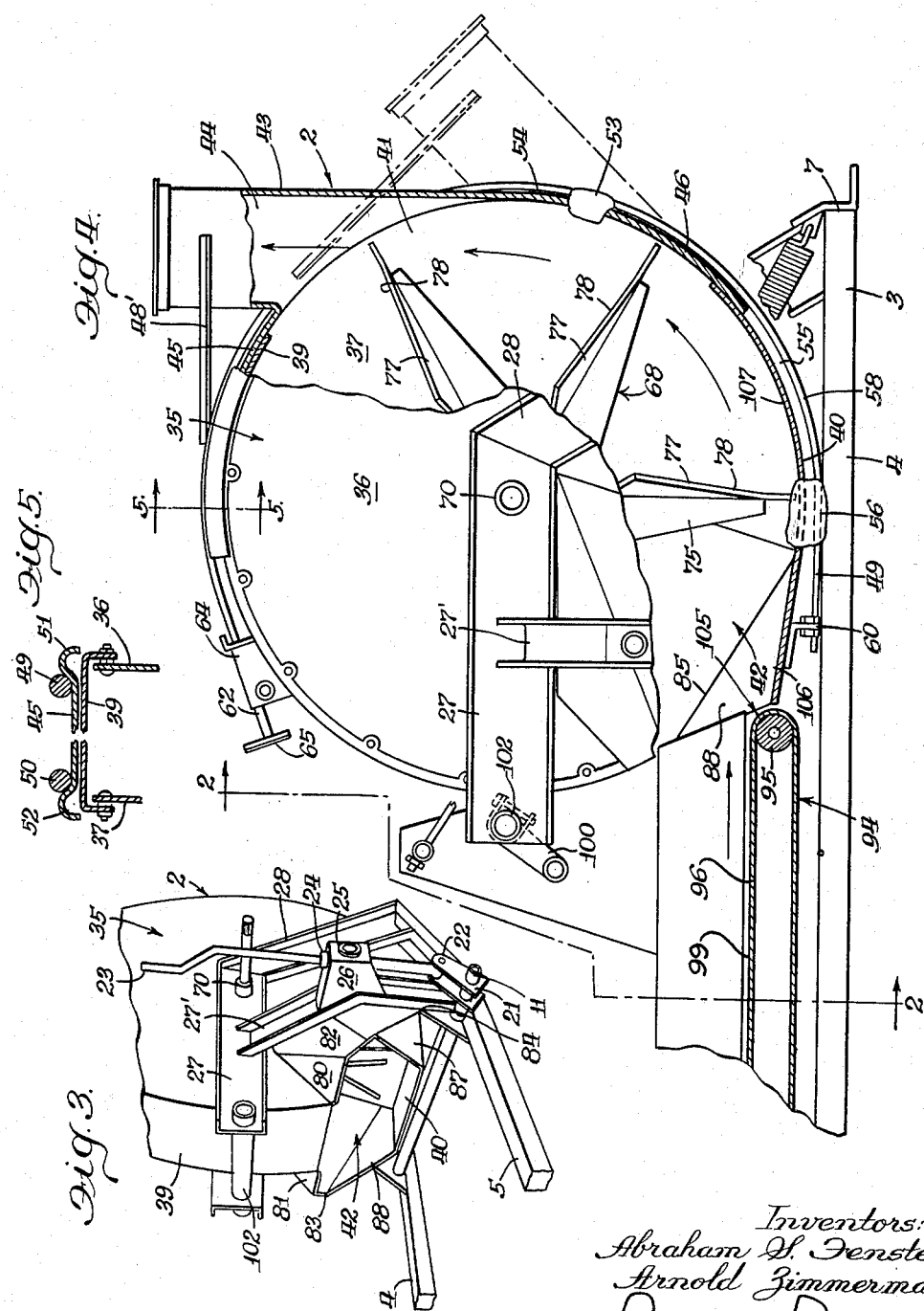
Inventors:
Abraham S. Fenster
Arnold Zimmerman
Paul O. Pippel
Atty.

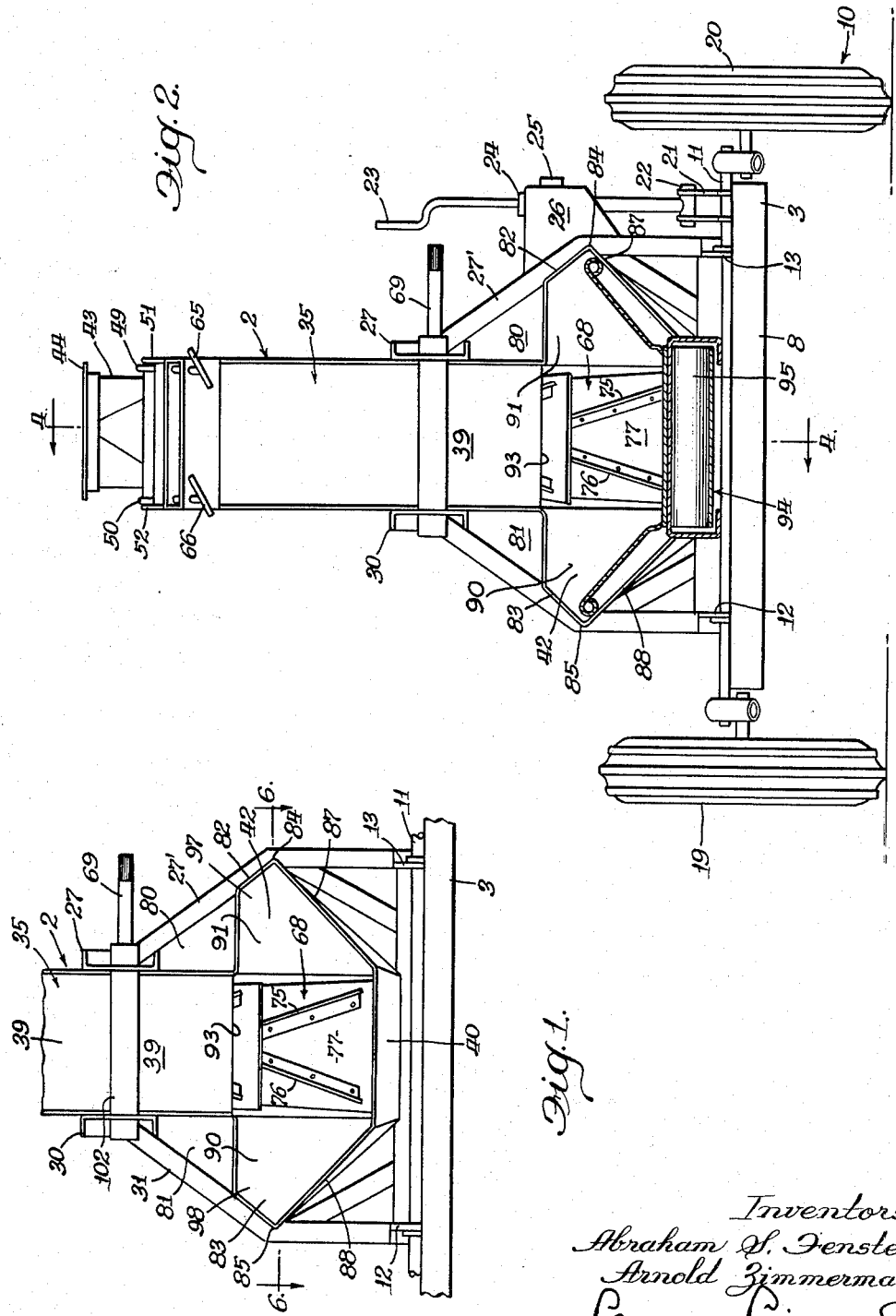

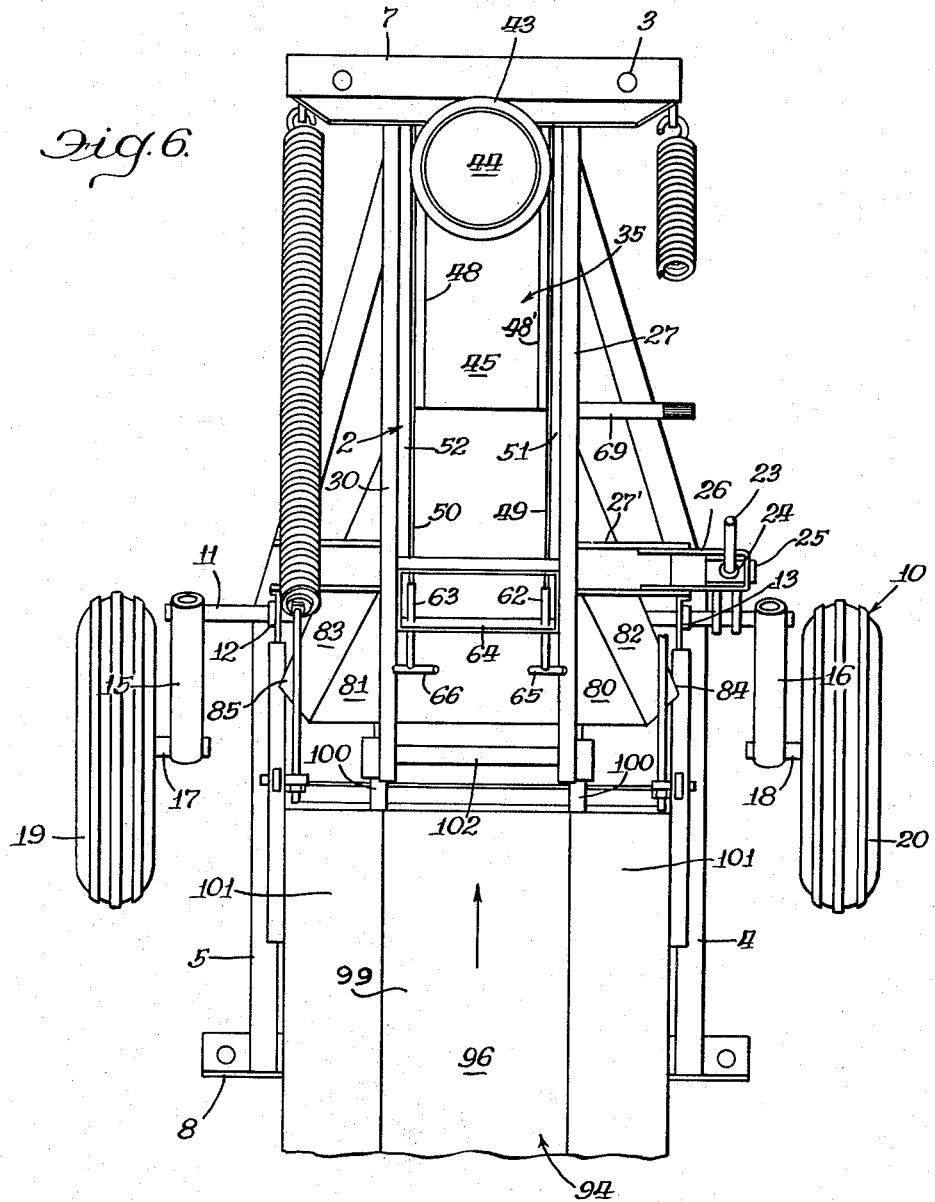

Inventors:
Abraham S. Fenster
Arnold Zimmerman

United States Patent Office 3,175,867
Patented Mar. 30, 1965

3,175,867
PERIPHERAL FEED BLOWER
Abraham S. Fenster, Chicago, and Arnold Zimmerman, Downers Grove, Ill., assignors to International Harvester Company, Chicago, Ill., a corporation of New Jersey
Filed May 31, 1962, Ser. No. 199,028
17 Claims. (Cl. 302—37)

This invention relates to blowers of the type for conveying forage crops and the like up an extensive conduit such as a length of pipe for filling a silo.

Heretofore, it has been conventional to provide a blower which rotates on a substantially horizontal axis and comprises a plurality of peripheral paddles which operate within a cylindrical housing for elevating the material. The construction took the form of providing an inlet at the eye or substantially at the center of the rotor fan through a side of the blower and the material was required to centrifugally exhaust from about the center of the fan to the periphery of the fan and then be carried by the paddles to the tangential discharge spout. The power requirements in such blower are enormous.

The feed of the material through the center or through the side of the rotor appeared to be dictated by the limitation that it was considered, at least from a theoretically good design point of view, that the material had to be introduced through the center of the rotor and in order to gain velocity had to be expelled centrifugally in order to gain momentum. Thereafter the material had to be moved peripherally or circumferentially of the rotor in order to discharge it up the discharge spout. Feeding at the center or at the eye of the rotor resulted as a solution of problems which occurred when the material was attempted to be fed otherwise than at the center or through the side of the rotor. In previous attempts, as well as in those which we had experienced, the feeding of the material into the periphery of the rotor posed almost insurmountable problems in that the rotor being a fan member acted as such and would develop high pressures or velocities of air which would exhaust through the periphery of the rotor. In attempting to introduce the material through the periphery of the rotor the air would exhaust at the inlet and would actually blow the material out of the inlet.

A general object of the invention is to provide a novel peripheral feed blower of exceptionally high capacity and which entirely obviates the difficulties heretofore mentioned.

A further object of the invention is to provide a novel blower wherein the material is introduced to the periphery of the rotor and is carried a minimum distance from the inlet to the outlet sufficient to enable the material to gain enough momentum and to become entrained in the air flow for movement great distances.

A still further object of the invention is to provide a novel blower which comprises a peripheral feed opening, the opening being so constructed as to accommodate a large volume of material and to provide a novel flow path for the air which assists in feeding and provides a pressure head for moving the material through the discharge conduit.

A further object of the invention is to provide a novel blower incorporating a pair of upright side members and a circumferential intervening member wherein the discharge spout is connected to the circumferential member, said circumferential member being circumferentially adjustable to position the spout at various inclinations with respect to the vertical.

A still further object of the invention is to provide a novel inlet arrangement for a peripheral feed blower comprising panelling which flares outwardly and widens the inlet opening and provides an area for exhausting the air which is being centrifugally cast outwardly by the blower fan and which deflects the air flow to provide a scooping effect on the material being discharged into the inlet.

These and other objects and advantages inherent in and encompassed in the invention will become more readily apparent in the specification and the drawings, wherein:

FIGURE 1 is a fragmentary elevational view taken of the inlet and of the novel blower;

FIGURE 2 is a vertical transverse sectional view taken substantially on the line 2—2 of FIGURE 4;

FIGURE 3 is a fragmentary perspective view principally of the inlet end portion of the novel blower;

FIGURE 4 is a side elevational view partly in transaxial section taken substantially on the line 4—4 of FIGURE 2;

FIGURE 5 is a sectional view taken substantially on line 5—5 of FIGURE 4;

FIGURE 6 is a plan view; and

Description of the invention

Figure 7:
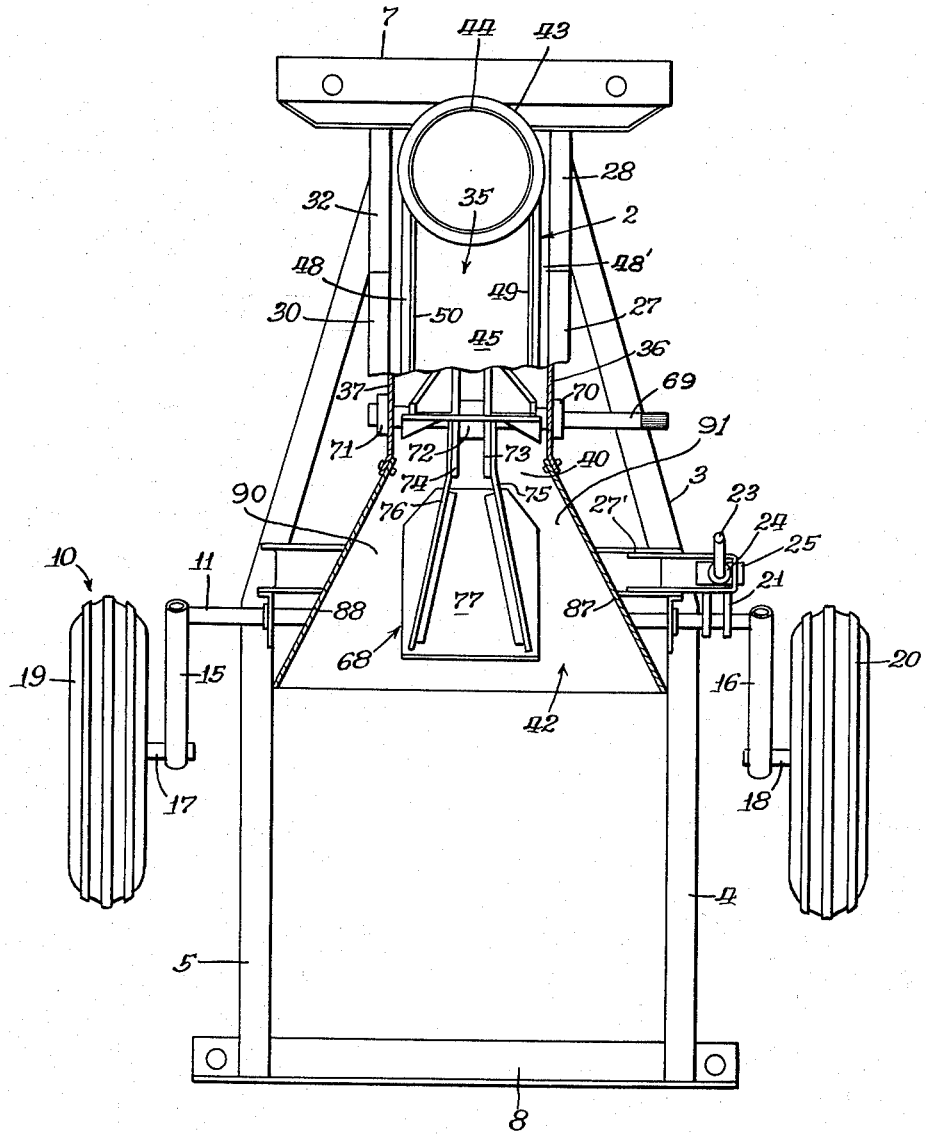
FIGURE 7 is a plan view partly in section taken substantially on the line 6—6 of FIGURE 1.

Describing the invention in detail and having particular reference to the drawings there is shown a blower generally designated 2 including a wheeled frame 3 which comprises a pair of laterally spaced side members 4 and 5 and interconnecting end members 7 and 8. Intermediate the ends of the frame 3 there is provided a wheel axle assembly generally designated 10 which includes a transverse axle structure 11 which is journalled at 12 and 13 respectively to the members 4 and 5, the ends of the axle member 11 being provided with arms 15 and 16 which are integral therewith, the arms 15 and 16 mounting spindles 17 and 18 which in turn journal the wheels 19 and 20. The axle 11 is connected to a radial arm structure 21 which is pivotally connected as at 22 to the lower end of an operating crank 23 which is threaded through a nut structure 24 pivotally mounted as at 25 to a bracket 26 which is carried from a standard 27' which is connected at its lower end to the member 4 and which angles inwardly of member 5 and connects to a brace 27, the brace 27 being connected to an auxiliary support standard 28 which at its lower end is also connected to the member 4 at a point laterally spaced from the connection of member 27 with respect to the member 5. The member 27 extends substantially horizontally and is laterally spaced from an opposing similar member 30 which is connected at laterally spaced areas to the upper ends of braces 31 and 32, the lower ends of said braces 31 and 32 being respectively connected to the side of the member 5.

The support structure which includes the braces connected to the members 28 and 30 and the members themselves embrace the housing 35 of the blower, said housing 35 comprising a pair of laterally spaced substantially vertical generally flat side members 36 and 37 and intervening circumferentially spaced arcuate peripheral circumferential wall segments 39 and 40 which are integrally united with the side wall members 36 and 37 and define therewith an outlet 41 and the top and bottom margins of the inlet 42.

The outlet 41 is closed by a complementary circumferentially adjustable discharge spout assembly 43 which comprises a duct 44 which is positioned substantially tangentially with respect to the periphery of the blower housing. The duct portion 44 is integrated with circumferential curved wall segments 45 and 46 which respectively overlap the segments 39 and 40 of the housing.

The duct portion 44 is braced by means of the brace means 48 and 48' to the segment 45 and the entire assembly 43 is movable between an upright position of the duct 44 and an inclined position of the duct 44 as shown phantomized in FIGURE 4. The assembly 43 is clamped to the housing by means of a pair of laterally spaced straps 49 and 50 which lie alongside the opposite lateral edges of the housing along the hollow bead sections 51 and 52 which are formed along the opposite lateral edges of the portion 45 and along the beads 53 and 54 which are formed integral with the portion 46 and along the beads 55, 56 along the lateral edges of the portion 40. The free ends of the straps are connected to the frame cross member 60 beneath the blower. The free ends of the straps or rods 49 and 50 are threaded into the threaded sleeves 62, 63 which are rotatably mounted on the bracket 64 which is integrally connected with the adjacent portion of the blower housing. The sleeves 62 and 63 are provided with handles 65 and 66 by means of which the sleeve portions 62 and 63 may be threaded or unthreaded with respect to the respective rods 49 and 50 to loosen and tighten the same to provide hoop tension about the assembly 43. It will be realized that by loosening the straps 49 and 50 the discharge spout assembly 43 may be moved to any of the positions circumferentially of the rotor as necessity dictates and thereafter the members 62 and 63 may be tightened and the discharge assembly held in the desired location.

It will be seen from a consideration of the drawings that the sides of the housing 36 and 37 are substantially normal to the axis of rotation of the impeller generally designated 68, said axis being represented by the shaft 69 which at opposite ends is carried in bearings 70 and 71 located in the opposite sidewalls 36 and 37 of the housing. The impeller comprises a central hub portion 72 suitably fastened to the shaft 69, the hub portion 72 having a pair of axially spaced mounting disks 73 and 74 to which are fastened the radially inner ends of the paddle support arms 75 and 76 which carry the substantially rectangular paddles 77. The arms or supports 75 and 76 are disposed on the back sides of the paddles 77 which on their forward sides 78 are unobstructed. The paddles 77 having widths slightly less than the space between the side members 36 and 37 and the rotor may be driven by any convenient power source through the shaft 69, said rotator being rotated in a direction wherein the paddles move downwardly through the inlet opening 42 and sweep downwardly over the portion 40 and sling the material upwardly into the discharge structure or duct 43.

The feature and the critical part of the instant invention resides in the formation of the inlet opening. The inlet opening is formed as a substantial widening of the sheet metal at opposite sides of the inlet opening beyond the opposite sides of the casing sidewalls 36 and 37 whereby the entire inlet is wider than the width of the housing. The inlet opening is defined by the coplanar top wall portions 80 and 81 which extend substantially normal to the sidewalls 36 and 37 and slope downwardly toward the open end of the inlet opening. The walls 80 and 81 project laterally outwardly from opposite sides of the respective sidewalls 36 and 37 and then respectively merge into the laterally downwardly and outwardly extending upper sidewall portions 82 and 83 which at their lower edges merge into the apices 84 and 85 formed by the upper ends of the lower sidewall portions 87 and 88 which converge downwardly and merge into opposite lateral edges of the bottom wall segment 40 of the housing. Thus it will be seen that at opposite sides of the inlet opening 42 there are provided somewhat generally semi-conical or pyramidal pockets 90 and 91 or tunnels such that as the blades exit from the housing and pass through the inlet opening 42 below the edge 93 of the segment 39 of the housing the air which is trapped by the blade is exhausted to blow axially beneath the walls 80 and 81 and to rebound along the walls 82 and 83 and then flow back inwardly along the wall portions 87 and 88. Thus the high back pressure, exhausting from the periphery in conventional peripheral feed blower and which tends to blow material out of the inlet opening, is utilized to augment the infeed of the material delivered to the blower periphery by means of the conveyor 94 which in the instant invention is shown as comprising a roller 95 and the belt 96. The widened inlet opening serves an additional function of supplying air externally from the blower through the side pockets 97, 98 at opposite sides of the material.

The conveyor 94 is carried at its delivery end by hangers 100 which are connected at opposite sides of the trough portion 101 of the conveyor, said hangers 100 being pivotally mounted to opposite ends of a shaft 102 which is supported between and from the members 27', 30. The conveyor trough 101 in the operating position is adapted to rest upon the cross member 8 with the upper run 99 of the belt generally horizontal.

It will be seen that the delivery end 105 of the conveyor 95 discharges onto the forward end portion 106 of the segment 40, said portion 106 being substantially tangential to the peripheral path of the paddles and then merging into an arcuate rear section 107 which is substantially concentric with the path of the ends of the paddles. The paddles dip into the material and sling it up the section 107 and through the duct 44. The empty paddles then sweep along the sector 39 and reenter the inlet for another load.

Having described a preferred embodiment of the invention, it will be apparent that other forms of the invention will become readily apparent.

What is claimed is:

1. In a material blower, a generally cylindrical housing having laterally spaced generally parallel sides and intervening circumferentially spaced peripheral walls defining at the circumferential periphery of the rotor inlet and outlet openings, said outlet opening being substantially tangential, said inlet opening being wider than the space between said sides at the inlet end and extending inwardly to the sides.

2. The invention according to claim 1 and said sides having a wall conformation providing axially inwardly sloping air impingement surfaces.

3. The invention according to claim 1 and said sides comprising an upper wall portion extending axially outwardly of the respective side of the blower, a downwardly and outwardly extending intermediate wall portion projecting from said upper wall portion, and an inwardly sloping lower wall portion projecting downwardly from said intermediate wall portion to an adjacent peripheral wall portion.

4. In a material handling device, a blower comprising a pair of axially spaced opposed closed side walls and an intervening peripheral wall defining circumferentially spaced inlet and outlet openings about the circumferential periphery of the blower, said outlet opening being substantially tangnetial, said side walls having axially extended bulges at opposite side of the inlet opening providing air passages open at the periphery of the blower and forming lateral extensions of the inlet opening beyond the planes of said side walls, said inlet lining the sole entry for air and material into the blower.

5. In a material handling device, a housing having a pair of generally parallel upright sides and a peripheral intervening wall with a substantially horizontal lower inlet and a substantially vertical outlet between said sides, a rotor within the housing having peripheral blades extending widthwise between said sides in close confinement thereby, said sides having axially extended portions at opposite sides of the inlet flaring radially outwardly from adjacent the axis of rotation of the rotor and at said inlet spaced a substantial distance from the lateral edges of said blades and providing with the inlet the sole entry for material and air into the rotor.

6. In a material handling device, a generally cylindrical housing having a pair of laterally spaced rotor-confining upright side walls and a circumferential wall with a lower inlet opening and an substantially tangential upper outlet opening, said inlet opening defined by a generally horizontal bottom wall portion extending approximately tangentially from said circumferential wall, and said side walls having outwardly projected sections at opposite sides of the inlet opening providing a spacing therebetween greater than the normal spacing between the remainder of said side walls and directed downwardly and outwardly from adjacent the center of the housing toward its periphery, said inlet opening at the periphery of said housing being wider than the spacing between said upright side walls.

7. In a material handling device, a generally cylindrical housing having a pair of axially spaced side walls and an intervening circumferentially extending peripheral wall, said side walls providing a close confining rotor space therebetween, said peripheral wall having a generally tangential outlet opening and an inlet opening, said inlet opening defined by an outwardly bulging wall conformation on a side wall and diverging from the other side wall from minimum spacing therefrom adjacent to the center of the housing to maximum spacing therefrom adjacent to the periphery of the housing whereby said inlet opening at its inlet end is wider than the space between said side walls.

8. The invention according to claim 7 and said wall conformation providing axially converging air guiding surfaces.

9. In a blower having a rotor and a housing with a pair of side walls and a peripheral wall confining the rotor, said peripheral wall having inlet and outlet openings, said outlet opening being substantially tangential, said side walls having outwardly offset portions at said inlet opening whereby said inlet opening is substantially wider axially than the space between said side walls.

10. The invention according to claim 9 and said portions comprising a pair of radially outwardly diverging panel sections flanking said inlet opening.

11. The invention according to claim 9 and said panel sections having circumferentially spaced portions converging axially outwardly of the housing and developing a pair of air passages flanking said inlet.

12. The invention according to claim 9, said portions having panel sections with circumferentially spaced portions converging axially outwardly of the housing and developing a pair of air passages flanking said inlet, and said circumferentially spaced portions providing air funnels and air impingement surfaces guiding air flow along the upper edge of said inlet and along the lower edge of the inlet.

13. In a blower, a rotor having a plurality of radial vanes extending widthwise axially of the rotor, a close confining housing about the rotor having a pair of upright side walls and an intervening peripheral wall with an upper generally tangential outlet and a lower generally horizontal inlet, means mounting said rotor for rotation on a generally horizontal axis extending generally normal to said side walls, said side walls having portions at opposite sides of the inlet substantially coextensive therewith circumferentially of the rotor diverging radially outwardly and spaced from each other a distance substantially greater than the width of said vanes and the distance elsewhere between said side walls and providing an inlet wider than the normal spacing between the side walls, and said peripheral wall terminating at the top of the inlet below the horizontal plane through said axis.

14. In a blower, a rotor having radial vanes, a housing encasing the rotor and having side walls and an intervening peripheral wall with spaced inlet and outlet openings, said outlet opening extending generally tangentially of the housing, and air funneling and redirecting means at opposite sides of said inlet for exhausting air carried by said rotor toward the inlet opening axially outwardly pursuant to the vanes advancing toward said inlet and then redirecting the air flow inwardly toward the vanes as the air moves through said inlet.

15. The invention according to claim 14 and said means presenting surface means on the housing directed axially outwardly in the region at which the vanes enter the inlet and surface means on the housing directed axially inwardly in the region at which the vanes depart from the inlet.

16. The invention according to claim 14, said means presenting surface means on the housing directed axially outwardly in the region at which the vanes enter the inlet opening and surface means on the housing directed axially inwardly in the region at which the vanes depart from the inlet opening, and said surface means diverging radially outwardly.

17. In a forage blower, a generally cylindrical housing, said housing having a peripheral generally tangential outlet and an inlet, said inlet disposed generally horizontally, a feeding mechanism in discharging relation to the inlet, a blower in the housing coaxially arranged therewith and having vanes passing through the inlet, said housing having radial walls closely confining said vanes, said housing having an inlet portion substantially wider than the spacing between said walls.

References Cited by the Examiner
UNITED STATES PATENTS

| | | | |
|---|---|---|---|
| 826,459 | 7/06 | Wilder | 302—37 |
| 884,016 | 4/08 | Groves | 302—37 |
| 1,431,780 | 10/22 | Daignault | 302—37 |
| 2,575,639 | 12/51 | Scranton | 302—37 |
| 2,739,846 | 3/56 | Jacobsen | 302—37 |

SAMUEL F. COLEMAN, *Primary Examiner.*

ANDRES H. NIELSEN, *Examiner.*